UNITED STATES PATENT OFFICE.

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

CREEPER-TRACTOR.

1,296,572.  Specification of Letters Patent.  Patented Mar. 4, 1919.

Original application filed December 11, 1916, Serial No. 136,208. Divided and this application filed March 15, 1918. Serial No. 222,731.

*To all whom it may concern:*

Be it known that I, WILLIAM TURNBULL, a citizen of the United States, residing at Peoria, in the county of Peoria and State of Illinois, have invented new and useful Improvements in Creeper-Tractors, of which the following is a specification.

This invention relates to endless link track vehicles and tractors, and has for its object to eliminate wear and slack of the links of the chain track when coming in contact with the blank idler wheel on the truck frame.

In this type of machine, which is fully described in my co-pending application Serial Number 136,208, of which this is a divisional application, there are employed front and rear sprockets; the rear sprocket being the drive sprocket, the front or idler sprocket being blank and serving as a guide to conduct the track around the truck and beneath the supporting truck rollers in which the machine is carried. In all cases the tension to drive the machine is applied from the drive sprocket along the ground run of the track belt beneath the truck rollers, leaving more or less sag or slack in the upper idle portion of the track belt.

In this construction there is a tendency, especially when the chain has stretched, for the links to strike the blank idler wheel with some force, resulting in increased wear of the parts and causing considerable noise and clatter. Although the upper run of the chain is ordinarily supported upon guide rollers carried on the main tractor frame between the sprockets, necessarily these upper guide rollers being arranged some distance from the idler wheel and being movable relatively thereto, are ineffective to overcome the forcible striking of the links against the wheel and consequent vibration.

I have discovered that by arranging a roller or other suitable guide means comparatively close to the central point of the upper portion of the idler wheel and mounting such means on a support movable in accordance with the movement of the idler wheel, this slapping of the links against the wheel is overcome, and a desired tangential engagement of the links with the wheel is produced which results in a noiseless operation and reduces considerably the wear upon the parts.

One form which my invention may assume is exemplified in the following description and illustrated in the accompanying drawings, in which—

Figure 1 shows a side elevation of a tractor embodying my invention.

Fig. 2 shows a diagram of a roller mechanism and endless chain therefor, illustrating the backlash and tendency of the chain to sag and slap against the idler wheel.

Fig. 3 is a detail section of a track link pivotal connection.

In the drawings, I show a conventional form of tractor, embodying a main frame 10 equipped with a roller truck mechanism comprising an endless chain track 11, carried upon a rear driving sprocket wheel 12, journaled upon the main frame, and a front blank idler wheel 13 journaled upon a roller truck frame 14, usually made in two articulated sections connected pivotally together at 15 and carrying a series of rollers 16 resting upon the bottom run of the chain track. The main frame is in this type of machine supported by means of springs 17 upon the roller truck frame. A series of guide rollers 18 is arranged beneath the upper run of the chain track for supporting the same, and said rollers are carried upon longitudinally arranged bars 19 secured rigidly to the main frame 10. These rollers 18 are generally arranged some distance from each of the wheels 12 and 13 and in a plane slightly below a line tangential to the upper portions of both wheels.

The chain track is made up of a series of articulated link sections, each comprising parallel side bars 20, the side bars of alternate links being connected together by gudgeon blocks 21 and the intermediate links being connected to the alternate links by means of pins 22 passing through the gudgeon blocks. The gudgeon blocks 21 engage the teeth on the sprocket wheel 12, whereby the chain track is driven, and contact also with the periphery of the blank idler wheel 13, whereas the side bars straddle the rims of both wheels; the bottom edges of the side bars on the upper run of the track being adapted to engage the guide rollers 18.

As will be seen in Fig. 2, the chain track has a tendency to sag at the point 23 adjacent to the blank idler wheel, where there is no support between the nearest roller 18 and the central point of the upper portion of the idler wheel. Therefore, the gudgeon blocks 21 strike the rim of the idler wheel in a direction somewhat radial thereto instead of tangential, as is desired. The effect of this will be to permit a forcible collision between the idler wheel and links, which causes a clattering noise and results in a quick wearing of the links. This clash will be increased when the main frame and rollers 18 move relatively to the idler wheel 13 and its support.

I arrange guide rollers 24 one on either side of the wheel 13 comparatively close to the central point of the upper portion of the wheel and journal these rollers upon a standard 25, carried on a link 25ª, the latter connected to and preferably movable with the journal boxes 13ª of the blank idler wheel. The rollers 24 are flanged on their exterior sides and receive the chain between them and are preferably arranged with their upper surfaces a trifle higher than the upper surface of the blank idler wheel.

By reason of this arrangement the chain is supported at a point comparatively close to the center of the upper portion of the idler wheel, and this support is movable in unison with the wheel support. The operation is indicated in Fig. 1 where it will be seen that the links comprising the chain, come into engagement with the idler wheel in a downwardly and forwardly inclined direction and tangential to the wheel. The clash is thus eliminated as is also excessive wear. There will be no forcible collision between the links of the chain and the rollers 24 on account of the different manner in which the links engage the rollers. Here the bottom edges of the side bars 20 rest at all times upon the peripheries of the rollers 24, while on the idler wheel 13 only the gudgeon blocks 21 engage with the periphery and the side bars straddle the rim. Also, the links of the chain are tilted at this point, as shown in the diagram, and thus any tendency for the chain to sag is removed. The fact that the rollers 24 are somewhat closer to the adjacent roller 18 than the central point of the upper portion of the idler wheel also prevents any sagging of the chain, the rollers 24 in effect bridging the space which formerly existed between the idler wheel and the adjacent guide roller 18.

It will be noted that the distance between the rollers 24 and the central point on the upper portion of the idler wheel rim approximates the length of one link section, and, therefore, the chain cannot readily sag so as to permit the links to slap the rim of the idler wheel. These parts being movable in unison with each other will insure the proper engagement of the links with the idler wheel at all times, regardless of any rocking or oscillation of the roller truck frame.

With the construction thus described the track is supported adjacent to the front sprocket by means of one or more floating rollers which are so mounted as to move vertically or approximately so, in accordance with the vertical movements of the front of the truck; this form of cushioning means, or equivalent construction, providing in effect a cushioning device and tangential support for the track immediately adjacent to the point where it is received onto the front or idler sprocket.

It will be understood that various changes in the construction and arrangement of the several parts may be made without departing from the spirit and principle of the invention.

Having thus described my invention, what I claim and desire to secure by Letters Patent is—

1. In a tractor of the self-laying track type, the combination of a main frame, a truck frame on which the main frame is yieldingly supported, a rear drive sprocket wheel, a front idler wheel mounted on the truck frame, an endless, flexible, self-laying track passing around the two wheels, and guide means adjacent to the front sprocket and pivotally mounted so as to move vertically or approximately so in accordance with the vertical movements of the front of the truck.

2. In a tractor of the self-laying track type, the combination with a main frame, a rear drive sprocket mounted thereon, an articulated truck in line with the rear sprocket, springs interposed between the main frame and the truck for yieldingly supporting the load on the truck, a front idler on the truck, an endless, flexible, self-laying track passing around said sprocket and idler, and guide means adjacent to the idler sprocket and pivotally mounted to move vertically or approximately so in accordance with the vertical movements of the front of the truck.

3. In a tractor, the combination of a main frame, a rear drive sprocket, a truck on which the main frame is yieldingly supported, a front idler on the truck, an endless, self-laying track passing around the sprocket and idler, guide rollers for the upper run of the track mounted on the main frame, and a floating roller mounted adjacent to the idler and capable of an up and down movement in unison with the movements of the truck to direct the track tangentially onto the idler.

4. In a tractor, the combination of a main frame, a rear drive sprocket, a truck on which the main frame is yieldingly supported, a front idler on the truck, an endless, self-laying track passing around the sprocket and idler, guide rollers for the upper run of the track mounted on the main frame, a floating roller mounted adjacent to the idler and capable of an up and down movement in unison with the movements of the truck to direct the track tangentially onto the idler, and means by which the floating roller maintains the same relative position with respect to the front idler irrespective of the shifting of the position of the idler on the truck.

In testimony whereof I have hereunto set my hand in the presence of two subscribing witnesses.

WILLIAM TURNBULL.

Witnesses:
  LOUIS B. NEUMILLER,
  CARL A. FUNDAN.